(12) United States Patent
Follmann et al.

(10) Patent No.: US 8,151,205 B2
(45) Date of Patent: Apr. 3, 2012

(54) METHODS, APPARATUSES, AND COMPUTER PROGRAM PRODUCTS FOR PROVIDING ACTIVITY COORDINATION INFORMATION

(75) Inventors: Andreas Follmann, Berlin (DE); Klaus Hartl, Berlin (DE); Felix Petersen, Berlin (DE); Jeanny Wang, Berlin (DE); Katharina Birkenback, Berlin (DE); Sean Treadway, Berlin (DE)

(73) Assignee: Nokia Corporation (FI)

( * ) Notice: Subject to any disclaimer, the term of this patent is extended or adjusted under 35 U.S.C. 154(b) by 769 days.

(21) Appl. No.: 12/241,616

(22) Filed: Sep. 30, 2008

(65) Prior Publication Data

US 2010/0083157 A1 Apr. 1, 2010

(51) Int. Cl.
G06F 15/00 (2006.01)
G06F 13/00 (2006.01)
(52) U.S. Cl. ......................... 715/771; 715/712
(58) Field of Classification Search .......... 715/853–855, 715/763–765, 717, 708, 710–712, 781, 700
See application file for complete search history.

(56) References Cited

U.S. PATENT DOCUMENTS

| | | | |
|---|---|---|---|
| 5,990,886 A | 11/1999 | Serdy et al. | |
| 7,007,228 B1 * | 2/2006 | Carro | 715/210 |
| 7,330,112 B1 | 2/2008 | Emigh et al. | |
| 2005/0192025 A1 * | 9/2005 | Kaplan | 455/456.1 |
| 2005/0268254 A1 | 12/2005 | Abramson et al. | |
| 2006/0200490 A1 * | 9/2006 | Abbiss | 707/102 |
| 2006/0271287 A1 | 11/2006 | Gold et al. | |
| 2008/0040678 A1 | 2/2008 | Crump | |
| 2008/0043037 A1 * | 2/2008 | Carroll | 345/629 |

FOREIGN PATENT DOCUMENTS

| | | |
|---|---|---|
| EP | 1 045 345 A1 | 10/2000 |
| WO | WO 00/41090 A1 | 7/2000 |
| WO | WO 2007/056449 A2 | 5/2007 |
| WO | WO 2007/097037 A1 | 8/2007 |

OTHER PUBLICATIONS

International Search Report and Written Opinion for PCT/FI2009/050688 mailed Jan. 22, 2010.
Google Maps, http://maps.google.com/help/maps/tour/index.html, 2008.

* cited by examiner

*Primary Examiner* — Cao "Kevin" Nguyen
(74) *Attorney, Agent, or Firm* — Alston & Bird LLP

(57) ABSTRACT

A method, apparatus, and computer program product are provided, which may provide activity coordination information. An apparatus may include a processor configured to cause a map to be displayed in a viewing agent. The processor may be further configured to receive an indication of a selection of a location on the map. The processor may also be configured to determine one or more information atoms having associated location information defining a location within a predefined distance of the selected location. The processor may additionally be configured to cause the one or more determined information atoms to be displayed in the viewing agent. Corresponding methods and computer program products are also provided.

27 Claims, 10 Drawing Sheets

METHODS, APPARATUSES, AND COMPUTER PROGRAM PRODUCTS FOR PROVIDING ACTIVITY COORDINATION INFORMATION

TECHNOLOGICAL FIELD

Embodiments of the present invention relate generally to mobile communication technology and, more particularly, relate to methods, apparatuses, and computer program products for providing activity coordination information.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies as well as evolved computing devices making use of networking technologies continue to facilitate ease of information transfer and convenience to users. One area in which there is a demand to further improve the convenience to users is harnessing the connectivity and ready access to information available through expansion of networking technologies for the provision of activity coordination information.

For example, modern computing technologies may facilitate management of, access to, and communication with a user's contacts. Additionally, existing networking and computing technologies may facilitate scheduling and viewing of activities, such as in a calendar application, by computing device users. Computing devices may also be configured to determine a current location of a user, such as through Global Positioning System (GPS) technology. Social networking services, such as Facebook™, MySpace™, and LinkedIn™, may facilitate interaction between a user and contacts. However, users currently lack a system for harnessing available information and integrating various services so as to provide users with a meaningful system for planning, creating, coordinating, and sharing activities with contacts.

Accordingly, it may be advantageous to provide computing device users with methods, apparatuses, and computer program products for providing activity coordination information.

BRIEF SUMMARY OF SOME EXAMPLES OF THE INVENTION

A method, apparatus, and computer program product are therefore provided, which may provide activity coordination information. In particular, a method, apparatus, and computer program product may be provided to enable, for example, searching for activity coordination information, such as, for example, activities, contacts, and/or places, based at least in part upon a query criteria. In an exemplary embodiment, a user may be able to select a location on a map using a graphical interface without being required to know and enter location information such as addresses or latitude and longitude coordinates. The user may then be presented with contacts, activities, and/or places having an associated location within a predefined distance of the selected location. In some embodiments, activity coordination information may be aggregated into sets and users may be able to filter the aggregated sets of information based at least in part upon a selected filtering parameter.

In one exemplary embodiment, a method is provided which may include causing a map to be displayed in a viewing agent. The method may further include receiving an indication of a selection of a location on the map. The method may also include determining one or more information atoms having associated location information defining a location within a predefined distance of the selected location. The method may additionally include causing the one or more determined information atoms to be displayed in the viewing agent.

In another exemplary embodiment, a computer program product is provided. The computer program product includes at least one computer-readable storage medium having computer-readable program instructions stored therein. The computer-readable program instructions may include first, second, third, and fourth program instructions. The first program instruction is for causing a map to be displayed in a viewing agent. The second program instruction is for receiving an indication of a selection of a location on the map. The third program instruction is for determining one or more information atoms having associated location information defining a location within a predefined distance of the selected location. The fourth program instruction is for causing the one or more determined information atoms to be displayed in the viewing agent.

In another exemplary embodiment, an apparatus is provided, which may include a processor configured to cause a map to be displayed in a viewing agent. The processor may be further configured to receive an indication of a selection of a location on the map. The processor may also be configured to determine one or more information atoms having associated location information defining a location within a predefined distance of the selected location. The processor may additionally be configured to cause the one or more determined information atoms to be displayed in the viewing agent.

In another exemplary embodiment, an apparatus is provided that may include means for causing a map to be displayed in a viewing agent. The apparatus may further include means for receiving an indication of a selection of a location on the map. The apparatus may also include means for determining one or more information atoms having associated location information defining a location within a predefined distance of the selected location. The apparatus may additionally include means for causing the one or more determined information atoms to be displayed in the viewing agent.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
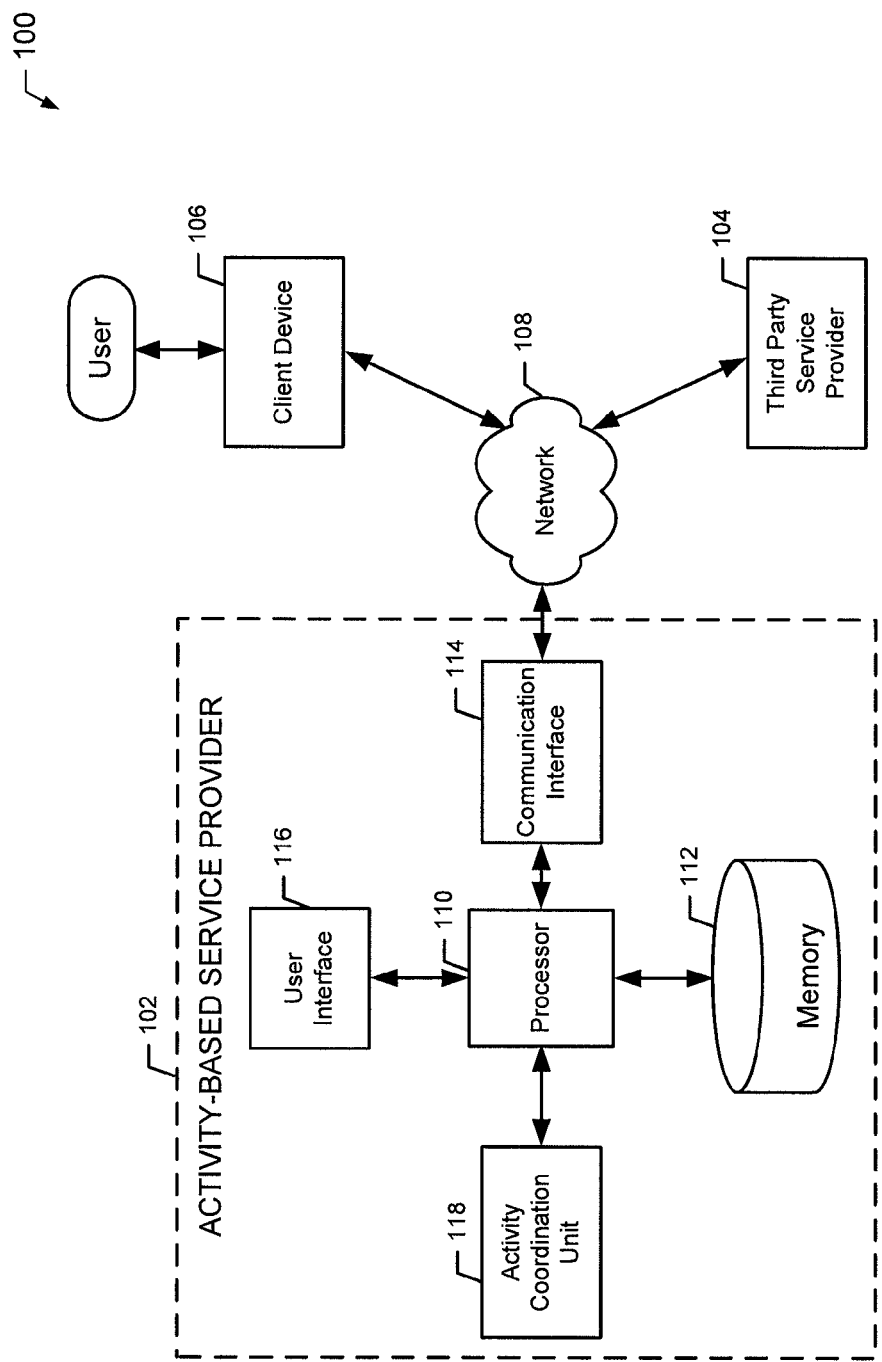
FIG. 1 illustrates a block diagram of a system for providing activity coordination information according to an exemplary embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a system 100 for providing activity coordination services according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for providing activity coordination information, numerous other configurations may also be used to implement embodiments of the present invention.

As used herein, "activity" refers to a description of any event in which a user may participate. Such an activity may be, for example, a social event, sporting event, performing arts event, business meeting, personal appointment, and/or the like. In an exemplary embodiment, an activity may comprise one or more users participating in the activity, a place (e.g., location) at which the activity will occur, a time at which the activity will occur, an activity type (e.g., a social event, sporting event, performing arts event, business meeting, personal appointment, and/or the like), and/or the like. It will be appreciated that the place may comprise a real world location, a virtual world location, or some combination thereof. In an exemplary embodiment, an activity may be represented digitally as a shareable object that may be spread to contacts so as to inform them of an activity. In this regard, the activity may have a fixed uniform resource locator address associated with it such that users may reference the activity as an address that may be provided to contacts, such as via a message.

As used herein, a "contact" refers to a person with which a user may interact using an activity-based service provider and may be another user of an activity-based service provided by the activity-based service provider. In this regard, a user may invite a contact to participate in an activity. It will be appreciated that a "contact" as used herein need not be previously known to a user and may, but need not be stored in an address book or friend list of a user of an activity-based service provider.

Referring now to FIG. 1, the system 100 may include an activity-based service provider 102, third party service provider 104, and client device 106 configured to communicate over a network 108. The activity-based service provider 102 may be embodied as any computing device or plurality of computing devices configured to provide activity-based services, such as those provided by Plazes.com, which will be described herein below, to users of remote devices, such as a client device 106, over the network 108. In an exemplary embodiment, the activity-based service provider 102 may be embodied as a server or plurality of servers, such as may comprise a server cluster or rack of blade servers. The third party service provider 104 may likewise be embodied as any computing device or plurality of computing devices and in an exemplary embodiment may be embodied as a server or plurality of servers. The third party service provider may be configured to provide any type of service (e.g., a navigation service, social networking service, multimedia service, internet search service, blog service, newsreader service, etc.) to users of remote computing devices, such as, for example users of a client device 106. The activity-based service provider 102 and third party service provider 104 may be further configured to communicate with each other so as to share service information in order to provide more robust and cohesive services to users. The client device 106 may be embodied as any computing device configured to communicate with an activity-based service provider 102 over the network 108 so as to create, manage and access activities. In some embodiments, the client device 106 may be embodied as a mobile computing device, such as, for example a mobile terminal 10 depicted in FIG. 2.

Figure 2:
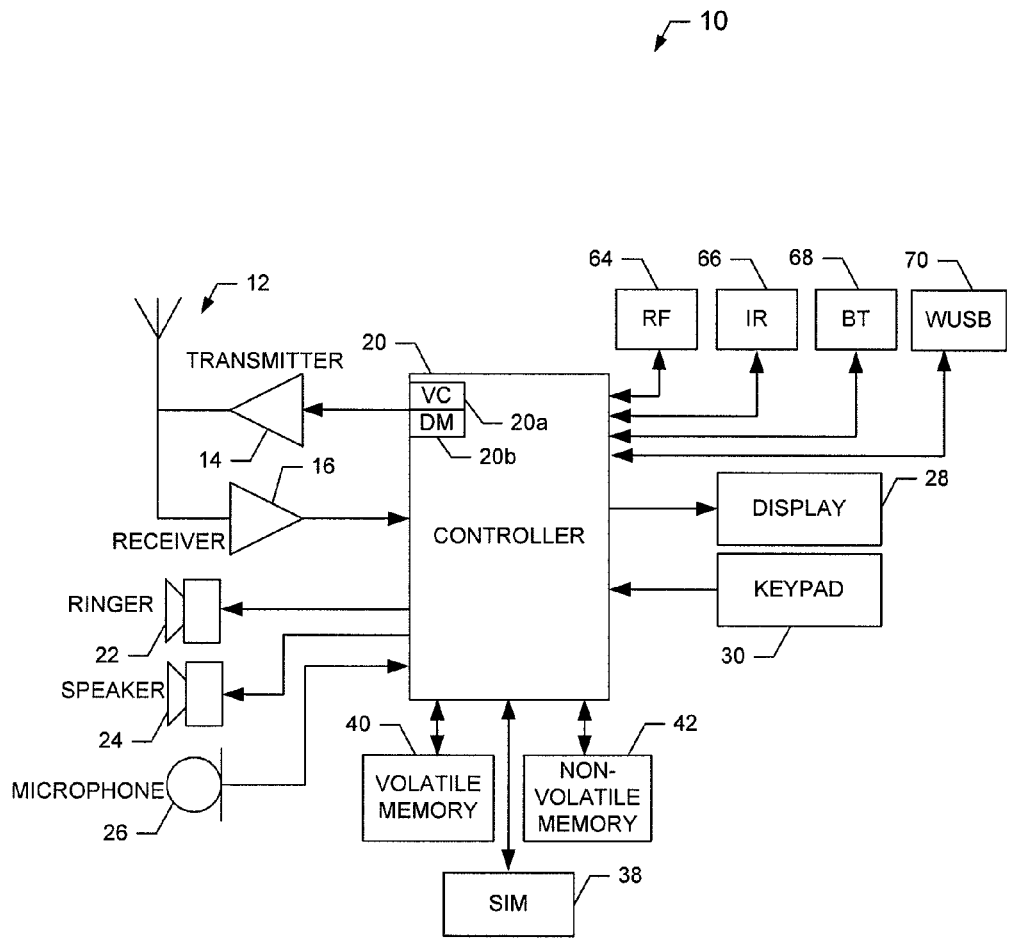
FIG. 2 is a schematic block diagram of a mobile terminal according to an exemplary embodiment of the present invention.

In this regard, FIG. 2 illustrates a block diagram of a mobile terminal 10 representative of one embodiment of a client device 106 in accordance with embodiments of the present invention. It should be understood, however, that the mobile terminal illustrated and hereinafter described is merely illustrative of one type of client device 106 that may benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. As used herein, "operationally coupled" may include any number or combination of intervening elements (including no intervening elements) such that operationally coupled connections may be direct or indirect and in some instances may merely encompass a functional relationship between components. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth transceiver 68 may be capable of operating according to ultra-low power Bluetooth technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, the client device 106 is not limited to being embodied as a mobile terminal 10 and may be embodied as any computing device, mobile or fixed, and accordingly may be embodied as a server, desktop computer, laptop computer, mobile terminal 10, and/or the like. The network 108 may comprise one or more wireless networks, wireline networks, cellular networks, or combination thereof. In an exemplary embodiment, the network 108 may be embodied as or comprise the internet. It will be appreciated that while FIG. 1 illustrates only a single third party service provider 104 and a single client device 106, the system 100 may comprise multiple third party service providers 104 and/or multiple client devices 106.

Figure 3:
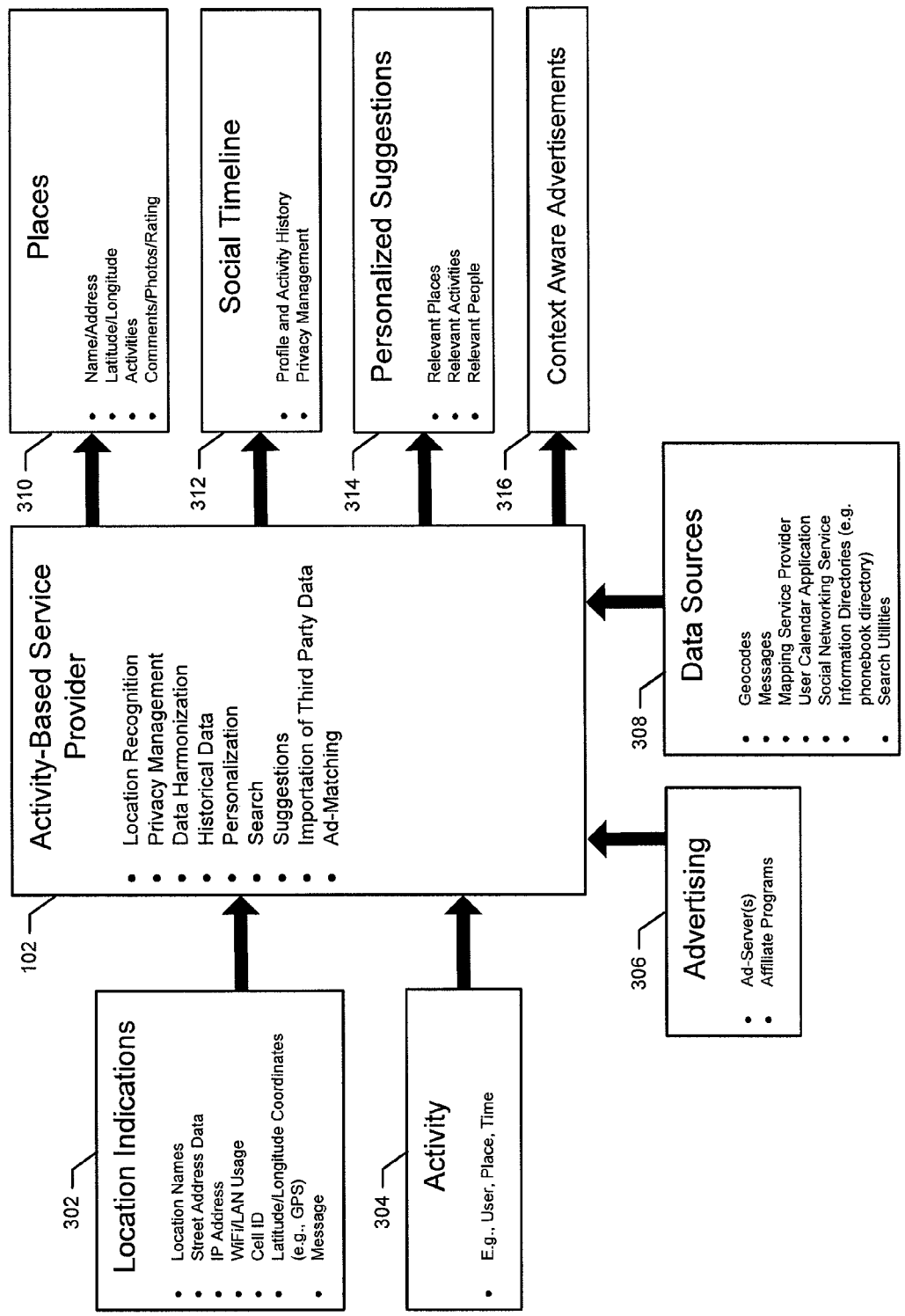
FIG. 3 is an information flow and processing diagram of information that may be received, processed, and sent by an activity-based service provider according to an exemplary embodiment of the present invention.

FIG. 3 illustrates a generalized information flow and processing diagram of data and information that may be received, processed, and sent by an activity-based service provider 102 according to an exemplary embodiment of the present invention. It will be appreciated, however, that FIG. 3 is merely for purposes of example and an activity-based service provider 102 may be configured to provide additional services as well as receive, process, and/or send information beyond that shown in FIG. 3. In this regard, an activity-based service provider 102 may be configured to receive various data, such as from a client device 106, third party service provider 104, and/or other device over the network 108. For example, the activity-based service provider 102 may be configured to receive one or more indications of a location of an activity. The location indications (box 302 of FIG. 3) may comprise an indication of a user's current location, such as may be determined from a current position of a client device 106 or may be an indication of a location at which a user will be in the future. Potential location indications may include a location name (e.g., Bob's house, Dave's office, and/or the like), street address data, an internet protocol address that may be correlated to a real world physical address or to a virtual world address, wireless access point usage (e.g. a local access network or the like) that may be correlated to a real world physical address or to a virtual world address, cell identification data identifying a cell from which a user's client device 106 is currently accessing a network, latitude and longitude coordinates such as may be determined by a global positioning system that may be embodied on a client device 106, a message (e.g. a short message service (SMS) message, multimedia messaging service (MMS) message, instant message (IM), e-mail, and/or the like) that may include a natural language indication of a location, and/or the like. Accordingly, the activity-based service provider 102 may be configured to recognize a location from the received location indication(s) and may be configured to associate the location with an activity.

The activity-based service provider 102 may further be configured to receive an activity (box 304 of FIG. 3), which may include associated information regarding time, place or location, user creating or hosting the activity, an activity type, any contacts participating or invited to the activity, and/or the like. The activity may be received, for example, from a client device 106, third party service provider 104, and/or other device over the network 108. A user of the client device 106 may enter the activity information via a user interface of the client device 106 and send the activity to the activity-based service provider. It will be appreciated that the activity-based service provider 102 may be configured to facilitate user entry and transmission of activity information over any number of interfaces, including, for example, a web page that may be loaded in a web browser, a dedicated application, and/or the like. Additionally or alternatively, the activity-based service provider 102 may be configured to receive activity data from a schedule management application, such as, for example, a calendar application, and/or from a third party service provider 104. The activity-based service provider may further be configured to provide sensory creation of activities. In this regard, the activity-based service provider may, for example, determine a user's location from one or more of the location indications above and create an activity associated with the user and the determined location. Sensory creation of activities may further comprise utilizing any data that may be received from a data source.

The activity-based service provider 102 may further be configured to receive data (box 308 of FIG. 3) that may be used by the activity-based service provider 102 to create activities, share activities, coordinate activities, as well as provide meaningful information to remote users about activities from a plurality of data sources. The data sources may comprise or may be embodied on any device accessible to the activity-based service provider 102 over the network 108 and may include, for example, a client device 106, third party service provider 104, cellular network devices that may provide cell ID information, as well as other devices. These data sources may include, for example, geocodes that may associate location data such as may be received as a location indication with a meaningful physical or virtual location, messages (e.g. a short message service (SMS) message, multimedia messaging service (MMS) message, instant message (IM), e-mail, and/or the like), a mapping service provider, a calendar application, a social networking service, an information directory (e.g., a phonebook directory), search utilities, and/or the like. These data sources may be embodied on a client device 106 and/or as a third party service provider 104.

The activity-based service provider 102 may be further configured to receive advertising data (box 306 of FIG. 3), such as from an advertising server, which may be embodied as a third party service provider 104. This advertising data may comprise various advertising content that the activity-based service provider 102 may be configured to match with activities or other user data when providing information to remote users such that users may receive requested information along with related advertising content. In this regard, the activity-based service provider 102 may provide targeted, context aware advertising (box 316 of FIG. 3) based at least in part upon information context. These context aware advertisements may be provided to a client device 106, third party service provider 104, or other device.

The activity-based service provider 102 may be configured to provide a plurality of activity-based services for users of devices such as a client device 106 using the received data and activity information. For example, the activity-based service provider 102 may be configured to provide location recognition such that a meaningful location can be determined from received location indications and associated with an activity. Further, the activity-based service provider 102 may be configured to associate a location with a "place." In this regard, a "place" may comprise location data, such as, for example, a street address or latitude and longitude coordinates, with context. This context may include information about the place, such as, for example, a name of a resident or property owner if the associated location is a residence (e.g., "Bill's House") or a business name if it is a business (e.g., "Nokia Headquarters"). Additionally or alternatively, the context information may include activities occurring at and/or scheduled to occur at the place. The context information may further include users that are currently located at the place, scheduled to be located at the place in the future (e.g., for an activity), and/or were previously located at the place (e.g., for an activity). The context information may additionally include user comments about the place, photographs of or related to the place, and/or user ratings of the place. In an exemplary embodiment, a place may be globally defined such that any user accessing information about a location or place may be directed to the associated place as well as associated context information. In this regard, a place may comprise an associated name such that users may identify the place by its name. A place may originally be defined by a user and/or may be defined by the activity-based service provider 102, such as based at least in part upon received activity data and/or location indications. Accordingly, a place may provide context to facilitate social interaction with respect to activities between users of the system 100.

In this regard, the activity-based service provider 102 may be configured to use available location, place, and/or context information to provide place and/or location data (box 310 of FIG. 3) to users of the system 100, such as by sending place data to devices of the system 100. These devices may include, for example, a client device 106, third party service provider 104, as well as other devices, where the place data may be viewed or otherwise accessed by a user. The place data may comprise a place name, address, longitude/latitude coordinates of the place, activities occurring at the place, user comments about the place, photographs of the place, and/or user ratings (e.g., popularity ratings) of the place.

The activity-based service provider 102 may additionally be configured to provide privacy management. In this regard, users may manage privacy settings with respect to how much information is shared with other users. Such information may comprise created activities, user profile information, activities in which the user is participating, historical activity data, places associated with the user, and/or the like. The activity-based service provider 102 may be configured to provide privacy management capabilities such that a user may define different privacy levels for different types of information and/or different groups of contacts (e.g., business contacts, personal contacts, unknown contacts, etc).

The activity-based service provider 102 may further be configured to provide data harmonization. Such data harmonization may include globally updating activity and place information across the system 100. Additionally or alternatively, data harmonization may comprise importing data from and/or exporting data to client devices 106 and/or third party service providers 104 such that data may be harmonized so as to be consistent across a plurality of services and/or applications that may be accessed from or reside on a plurality of devices of the system 100.

Additionally, the activity-based service provider 102 may be configured to aggregate historical data, such as data describing a user's history of activity participation, locations at which the user has been located, and/or the like. This historical data may be provided to the user and/or to contacts with permission to view the user's history, such as in the form of a social timeline (box 312 of FIG. 3). Also, this historical data as well as any associated user profile information, such as personal preferences, may be used by the activity-based service provider 102 to personalize activity-based services provided to the user. This personalization may include personalized suggestions (box 314 of FIG. 3) of relevant places, activities, and/or contacts in which the user may be interested. In an exemplary embodiment, the activity-based service provider may be further configured to provide a search service to users. In this regard, users of remote computing devices, such as a client device 106, may be able to search data stored or accessible by the activity-based service provider 102 for information regarding activities, places, and contacts.

Referring again to FIG. 1, the activity-based service provider 102 may include various means, such as a processor 110, memory 112, communication interface 114, user interface 116, and activity coordination unit 118 for performing the various functions herein described. These means of the activity-based service provider 102 as described herein may be embodied as, for example, hardware elements (e.g., a suitably programmed processor, combinational logic circuit, and/or the like), computer code (e.g., software or firmware) embodied on a computer-readable medium (e.g. memory 112) that is executable by a suitably configured processing device (e.g., the processor 110), or some combination thereof. The processor 110 may, for example, be embodied as various means including a microprocessor, a coprocessor, a controller, or various other processing elements including integrated circuits such as, for example, an ASIC (application specific integrated circuit) or FPGA (field programmable gate array). In an exemplary embodiment, the processor 110 may be configured to execute instructions stored in the memory 112 or otherwise accessible to the processor 110. Although illustrated in FIG. 1 as a single processor, the processor 110 may comprise a plurality of processors operating in parallel, such as a multi-processor system. Such multiple processors may be embodied in a single computing device or may be distributed across multiple computing devices, such as in a server cluster.

The memory 112 may include, for example, volatile and/or non-volatile memory. The memory 112 may be configured to store information, data, applications, instructions, or the like for enabling the activity-based service provider 102 to carry out various functions in accordance with exemplary embodiments of the present invention. For example, the memory 112 may be configured to buffer input data for processing by the processor 110. Additionally or alternatively, the memory 112 may be configured to store instructions for execution by the processor 110. The memory 112 may comprise one or more databases that store information in the form of static and/or dynamic information. In this regard, the memory 112 may store, for example, activities and associated information, places and associated information, user profiles, contacts, and/or the like, such as may be used in an activity-based service. This stored information may be stored and/or used by the activity coordination unit 118 during the course of performing its functionalities.

The communication interface 114 may be embodied as any device or means embodied in hardware, software, firmware, or a combination thereof that is configured to receive and/or transmit data from/to a network, such as the network 108, and/or any other device, such as a third party service provider 104 and/or client device 106, in communication with the activity-based service provider 102. In one embodiment, the communication interface 114 may be at least partially embodied as or otherwise controlled by the processor 110. The communication interface 114 may include, for example, an antenna, a transmitter, a receiver, a transceiver and/or supporting hardware or software for enabling communications with other entities of the system 100, such as a third party service provider 104 and/or client device 106 via the network 108. The communication interface 114 may be configured to receive and/or transmit data using any protocol that may be used for communications between the activity-based service provider 102 and other computing devices of the system 100, such as a third party service provider 104 and/or a client device 106, over the network 108. The communication interface 114 may additionally be in communication with the memory 112, user interface 116, and/or activity coordination unit 118, such as via a bus.

The user interface 116 may be in communication with the processor 110 to receive an indication of a user input and/or to provide an audible, visual, mechanical, or other output to the user. As such, the user interface 116 may include, for example, a keyboard, a mouse, a joystick, a display, a touch screen display, a microphone, a speaker, and/or other input/output mechanisms. However, in an exemplary embodiment wherein the activity-based service provider 102 is embodied as a server, elements of the user interface may be reduced or even eliminated. The user interface 116 may further be in communication with the memory 112, communication interface 116, and/or activity coordination unit 118, such as via a bus.

The activity coordination unit 118 may be embodied as various means, such as hardware, software, firmware, or some combination thereof and, in one embodiment, may be embodied as or otherwise controlled by the processor 110. In embodiments where the activity coordination unit 118 is embodied separately from the processor 110, the activity coordination unit 118 may be in communication with the processor 110. The activity coordination unit 118 may be configured to receive, process, and send data and information related to the provision of activity-based services as discussed above in conjunction with FIG. 3. In this regard, the activity coordination unit 118 may be configured to manage and store, such as in memory 112, activity coordination information. This activity coordination information may include, for example, activities, as well as contacts and/or places that a user of a client device 106 may utilize to schedule and/or coordinate activities. Accordingly, the activity coordination unit 118 may be configured to facilitate creation, access, and/or modification of activities, contacts, and/or places by users of an activity-based service.

In an exemplary embodiment, the activity coordination unit 118 may be configured to provide activity coordination information to a client device 106. In this regard, a user may interact with an activity-based service provided by the activity-based service provider via a viewing agent embodied on the client device 106. The viewing agent may be embodied, for example, as a web browser configured to receive data from and transmit data to the activity coordination unit 118. This data may comprise, for example, a web page, activity coordination information, query criteria, search results, filtering parameters, and/or the like. In an alternative embodiment, the viewing agent may be embodied as a dedicated application (e.g., a standalone application, applet executed by a web browser, and/or the like) configured to provide a user interface for an activity-based service. In embodiments where the viewing agent is embodied as a dedicated application, the viewing agent may be embodied as any means, including, for example, hardware, software, firmware, or some combination thereof. Such a dedicated application may be embodied and executed on the client device 106. Alternatively, such a dedicated application may be embodied as a web application accessible by the client device 106. The web application may, for example, be embodied as a series of program instructions stored on the memory 112 and executed by the processor 110. In some embodiments, the viewing agent may be embodied as the activity coordination unit 118.

The activity coordination unit 118 may be configured to provide activity coordination information to a client device 106 in response to a search request by a user of a client device 106. Accordingly, the activity coordination unit 118 may be configured to receive a search request from the client device 106. The search request may comprise an alphanumeric search string, a selection of an option in a graphical user interface, and/or the like and may include query criteria based at least in part upon which the activity coordination unit 118 may conduct a search of stored activity coordination information and/or services. The query criteria may comprise, for example, a location, a contact name, a timeframe (e.g., a time of day, a date, a range of dates, and/or the like), and/or the like.

Figure 4A:
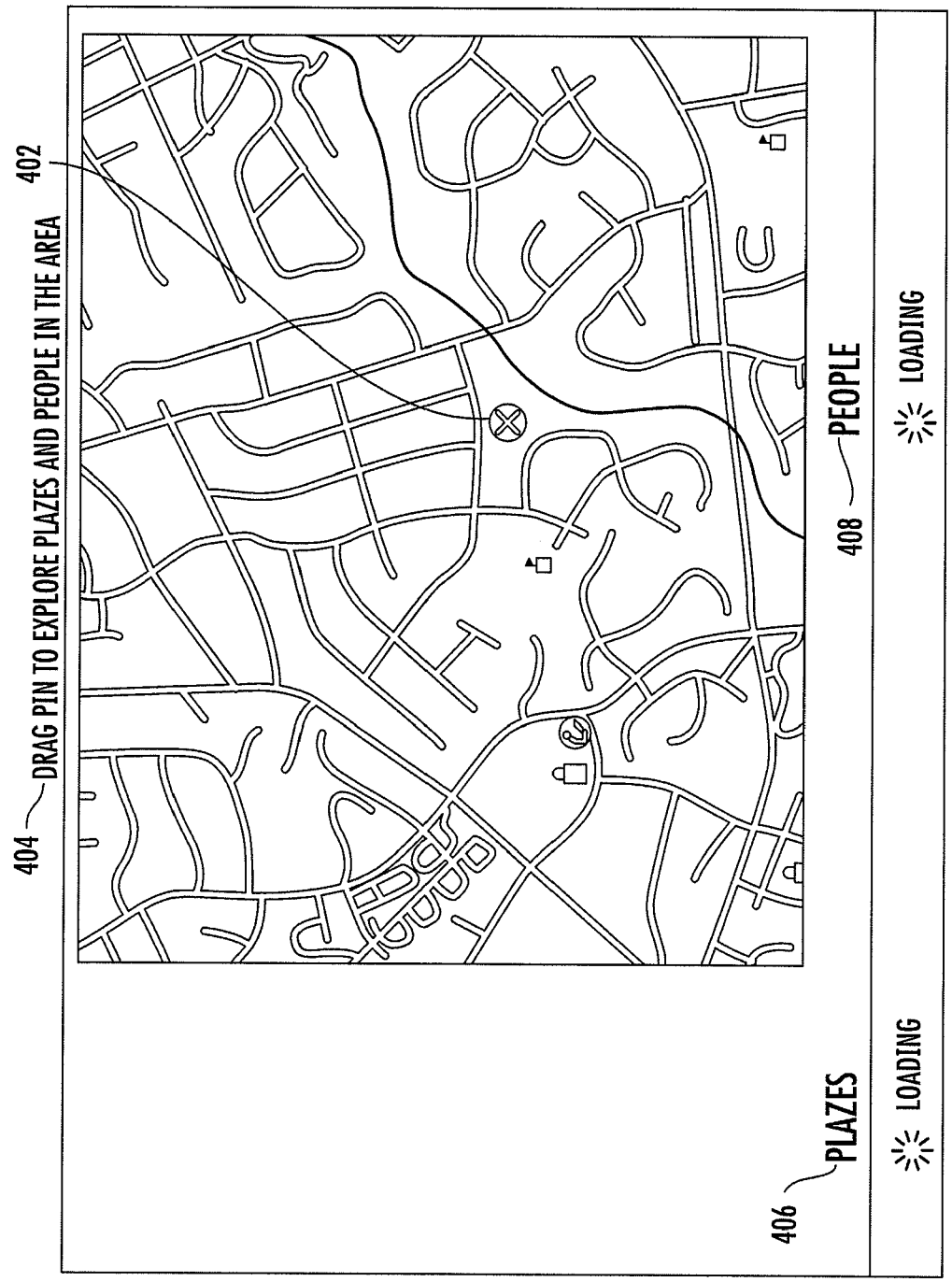
FIG. 4 illustrates a series of screenshots of an interface for providing activity coordination information according to an exemplary embodiment of the present invention.

In an exemplary embodiment, the activity coordination unit 118 may be configured to provide a graphical map-based user interface for receiving a search request and providing activity coordination information satisfying the query criteria. In this regard, FIG. 4 illustrates a series of screenshots of an interface for providing activity coordination information according to an exemplary embodiment of the present invention. As seen in FIG. 4a, the activity coordination unit 118 may be configured to cause a map and search interface to be displayed in a viewing agent on the client device 106. As used herein, language referring to the activity coordination unit 118 "causing" a graphic (e.g., a map) and/or information to be displayed refers to embodiments in which the activity coordination unit 118 actively instructs the viewing agent to display the map and/or information as well as to embodiments in which the activity coordination unit 118 sends data comprising a graphic and/or information to a client device 106 such that a viewing agent may render the map and/or information based at least in part upon the sent data. Accordingly, graphics and/or information which the activity coordination unit 118 causes to be displayed may be displayed in a viewing agent on a display device, such as a monitor, display screen, and/or the like, which may be embodied on or operatively coupled to the client device 106

Figure 4B:
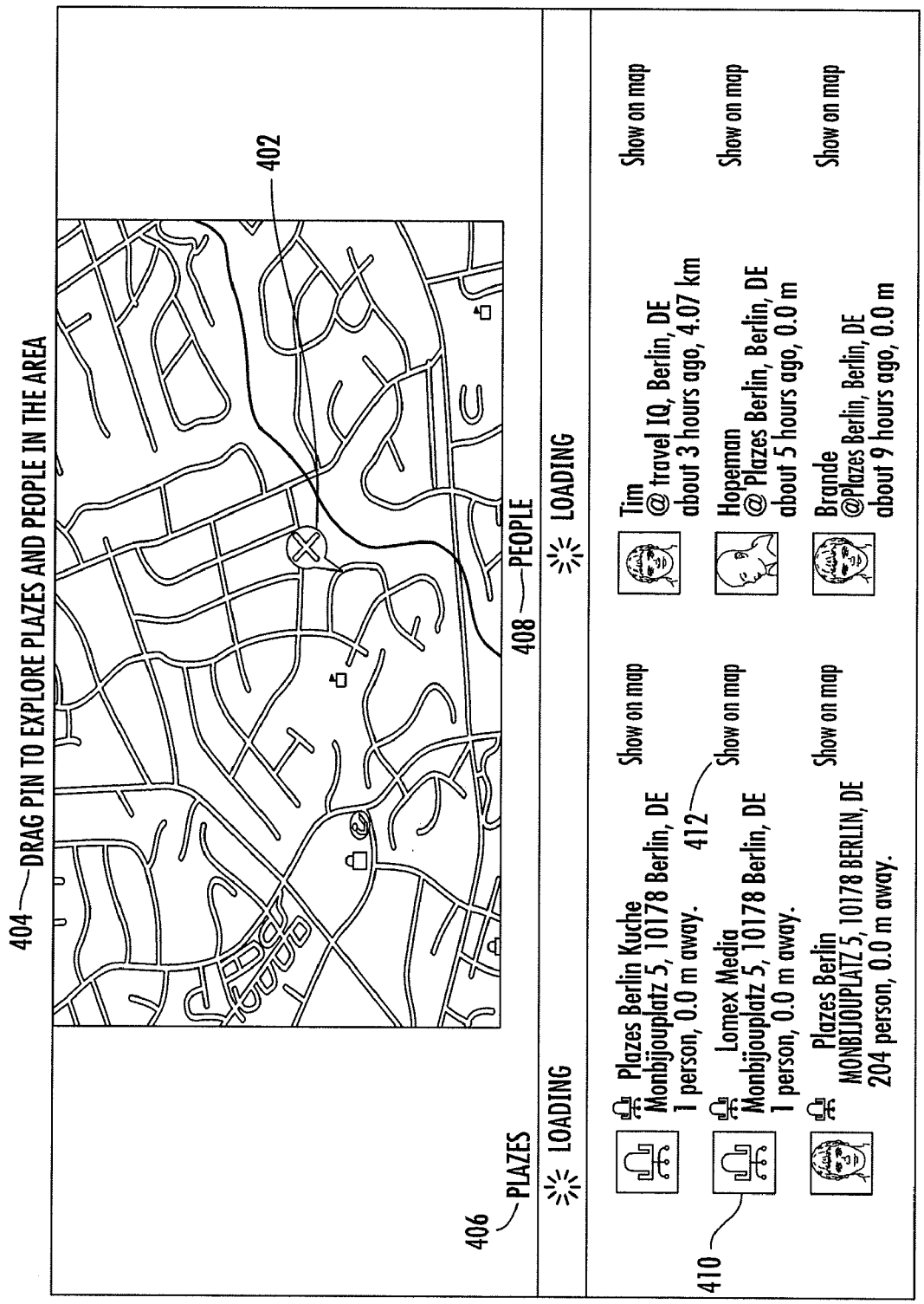
Figure 4C:
Figure 4D:
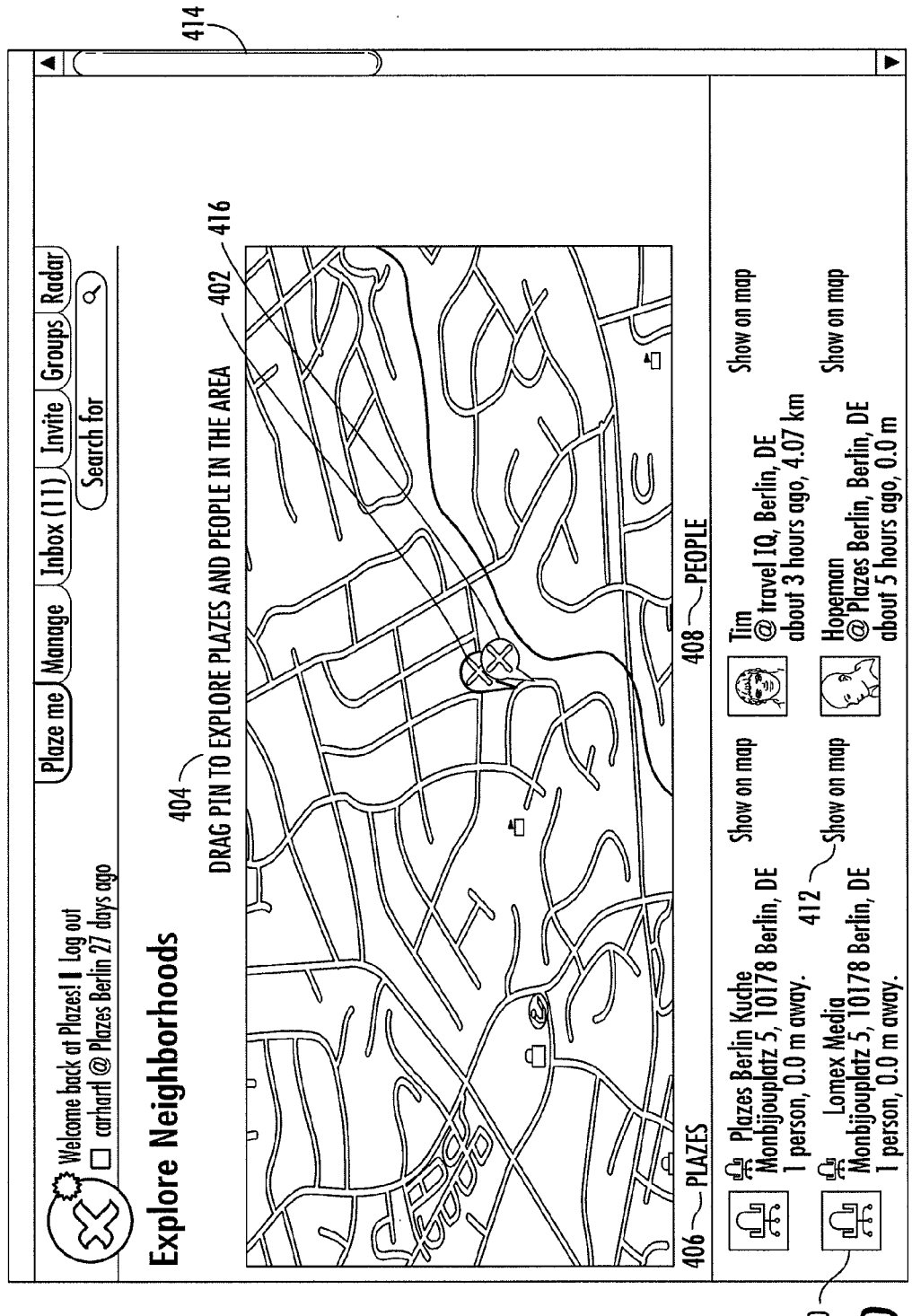
Figure 5:
FIG. 5 illustrates a screenshot of an interface for providing aggregated and filtered information according to an exemplary embodiment of the present invention.

In an exemplary embodiment, the activity coordination unit 118 may be configured to cause a search interface to be displayed in the viewing agent such that a user may select a location on the map with a graphical selection tool to define query criteria for a search request. In this regard, a user of the client device 106 may manipulate an arrow, cursor, customized moveable graphic, and/or the like to position the graphical selection tool over a location on the map and click or otherwise select the location (e.g., with a mouse, scroll wheel, or other input device or means connected to or otherwise available on the client device 106) in order to define a location for query criteria. Referring to FIG. 4a, a user may be provided with a graphical selection tool 402 and may be prompted to "Drag pin to explore plazes and people in the area" 404. ("plazes" as illustrated and referred to in FIGS. 4 and 5 is equivalent to "places" as used herein) The user may then drag the selection tool 402 to a spot on the map so as to select a location on the map. In this regard, a user may graphically select a location without having to know and enter a street address, latitude and longitude coordinates, and/or other information about the location.

The activity coordination unit 118 may be configured to receive, from the client device 106, an indication of the selection of a location on the map by the user. The activity coordination unit 118 may, in some embodiments, correlate the selected location on the map with a street address and/or latitude and longitude coordinates such that the selected map location may be correlated with a real world physical address or positional coordinates that may be used to determine activities, places, and/or contacts in proximity to the selected location. In this regard, the activity coordination unit 118 may then be configured to determine stored activities, places, and/or contacts having associated location information defining a location within a predefined distance of the selected location by searching stored activities, places, and/or contacts. These stored activities, places, and/or contacts may be stored as "information atoms" comprising any information associated with the activities, places, and/or contacts. The predefined distance may be a system default defined by the activity-based service provider 102 or may be a distance defined by a user of the client device 106. This predefined distance in combination with the selected location may comprise the query criteria. In this regard, the activity coordination unit 118 may search information atoms stored in memory 112, such as in a database, to determine activities, places, and/or contacts satisfying the query criteria such that they have an associated location within the predefined distance of the selected location. Activities satisfying the query criteria may accordingly be scheduled to occur at a location within the predefined distance of the selected location. Likewise, places satisfying the query criteria may be located within the predefined distance of the selected location. Contacts currently located, previously located, and/or scheduled to be located within the predefined distance of the selected location may satisfy the query criteria. Although, location is discussed herein as an example of a query criteria, it will be appreciated that location is not the only possible query criteria and the activity coordination unit 118 may also be configured to determine information atoms satisfying additional and/or alternative query criteria, including, for example, information atom category (e.g., activity, type, or place), timeframe, a contact name, a specific place, an activity type, and/or the like.

The activity coordination unit 118 may further be configured to cause the one or more determined information atoms to be displayed in the viewing agent. In an exemplary embodiment, the activity coordination unit 118 may be configured to cause the one or more determined information atoms to be displayed in one or more lists. In this regard, each list may be comprised of a single category of information atoms. For example, FIG. 4b illustrates a first list of "Plazes" (e.g., places) 406 and a second list of "People" (e.g., contacts) 408. Each list is comprised of a plurality of information atoms 410 having the same category (e.g., activity, place, or contact) as the list category. As may be seen from FIG. 4b, each information atom may comprise an avatar, associated location information, a name, a description, and/or other information.

In an exemplary embodiment, the activity coordination unit 118 may be configured to cause means to select a displayed information atom to be displayed in the viewing agent. The means to select may comprise, for example, a graphical button, hyperlinked text, and/or the like and may, for example be embodied as the linked text "Show on map" 412 of FIG. 4b. A user may accordingly click on or otherwise interact with the means to select a displayed information atom 410 so as to select one of the determined information atoms. The activity coordination unit 118 may then be configured to receive an indication of a selection of one of the determined information atoms. The activity coordination unit 118 may be configured to determine a location for the selected information atom from location information comprising or otherwise associated with the information atom. The activity coordination unit 118 may further be configured to cause the determined location of the selected information atom to be illustrated on the map, such as with a graphical marker.

In an exemplary embodiment, the activity coordination unit 118 may, in situations wherein the field of display of the viewing agent displays only part of the map or even none of the map when the user selects an information atom, be configured to cause the viewing agent to be animated such that the field of display is scrolled until the map is displayed in the field of display. For example, referring to FIG. 4c, a user may scroll the field of display of the viewing agent using the scroll bar 414 so that the user may view determined information atoms that were not viewable in the field of display shown in FIG. 4b. In the field of display illustrated in FIG. 4c, the map is not visible. Accordingly, the activity coordination unit 118 may be configured to animate the viewing agent by causing the scroll bar 414 to automatically scroll until the map is again in view as illustrated in FIG. 4d. The activity coordination unit 118 may then cause the location of the selected information atom as defined by the location information associated with the selected information atom to be displayed on the map, as indicated by marker 416.

In some embodiments, the activity coordination unit 118 may be configured to aggregate one or more information atoms determined to satisfy a query into one or more sets of information atoms. The activity coordination unit 118 may be configured to aggregate information atoms into sets based upon any criteria. In this regard, for example, the activity coordination unit 118 may aggregate information atoms into one or more sets, with each set comprising information atoms related to a single contact, a group of contacts, a place, and/or the like. In an exemplary embodiment, the activity coordination unit 118 may be configured to aggregate one or more information atoms determined to satisfy a query into one or more sets of information atoms based at least in part upon a time associated with each determined information atom. The time associated with each determined information atom may comprise, for example, a time and/or date on which an activity is scheduled to occur. Thus, each aggregated set may comprise information atoms having an associated time that falls on a certain point in time or within a certain period of time (e.g., last month, last week, yesterday, today, tomorrow, next week, next month, and/or the like). An aggregated set may comprise, for example, a timeline of contacts and/or activities for a queried location. For example, the information atoms 410 of FIG. 4b may be arranged or otherwise presented such that the activity coordination unit 118 may be configured to cause the information atoms to be displayed in the viewing agent in a chronological order so as to comprise a timeline of contacts scheduled to be located at or within a predefined distance of the selected location 402 and/or a timeline of activities scheduled to occur at or within a predefined distance of the selected location 402. As such, a "timeline" may comprise any structural arrangement or ordering of information atoms such that they are in a chronological order, and is accordingly not limited to a linear arrangement. It will be appreciated that in some embodiments, the activity coordination unit 118 may store information atoms in aggregated sets such that information atoms determined to satisfy a query may not need to be aggregated into one or more sets following the activity coordination unit 118 performing the query.

The activity coordination unit 118 may additionally be configured to cause the one or more aggregated sets of information atoms to be displayed in the viewing agent. In this regard, FIG. 5 illustrates a screenshot of an interface for providing aggregated and filtered information according to an exemplary embodiment of the present invention. As may be seen in FIG. 5, a first aggregated set 502 of information atoms may comprise activities scheduled to occur "This Sunday"; a second aggregated set 504 of information atoms may comprise activities scheduled to occur "Next Week"; a third aggregated set 506 of information atoms may comprise activities scheduled to occur "This Month"; etc. The activity coordination unit 118 may additionally be configured to cause selection means for filtering the one or more aggregated sets of information atoms to be displayed in the viewing agent. Such selection means may comprise, for example, a search form in which a user may enter a filtering parameter, a drop down box 508 from which a user may select a filtering parameter, a date range selector 510 from which a user may select a filtering date or date range, and/or the like. A user may select a filtering parameter using the selection means so as to generate a request to filter the one or more displayed aggregated sets of information. The activity coordination unit 118 may accordingly be configured to receive a request to filter the one or more aggregated sets of information atoms based at least in part upon the selected parameter. The activity coordination unit 118 may be configured, in response to receipt of the filtering request, to filter the one or more aggregated sets of information atoms based at least in part upon the selected parameter. The activity coordination unit 118 may further be configured to cause the filtered information atoms to be displayed in the viewing agent.

The selected filtering parameter may comprise, for example, a timeframe, an individual contact, a group of contacts, a place, an activity type, and/or the like. For example, a user may select to filter the one or more aggregated sets of information atoms such that only information atoms related to a certain contact are displayed. In this regard, for example, a user may view a contact's itinerary of scheduled activities. Similarly, as another example, a user may select to filter the one or more aggregated sets of information atoms such that only information atoms comprising activities having a selected activity type are displayed. It will be appreciated that other filtering parameters may be selected and multiple filtering parameters may be combined to similarly filter the aggregated sets of information atoms.

In some embodiments, the activity coordination unit 118 may be configured to automatically filter or otherwise pair down information atoms determined to satisfy a query and/or aggregated information atoms. The activity coordination unit 118 may perform this filtering based at least in part upon any criteria. One such criteria may be the type of client device 106 used by a user to make a query or other request. For example, if the client device 106 is a mobile device, the activity coordination unit 118 may be configured to cause fewer information atoms to be displayed in the viewing agent than if the client device 106 were a personal computer because a mobile device may have a smaller display. Examples of other criteria that may be used by the activity coordination unit 118 include, but are not limited to, access rights, privacy settings associated with a contact's location, privacy settings associated with an activity, and/or the like.

Figure 6:
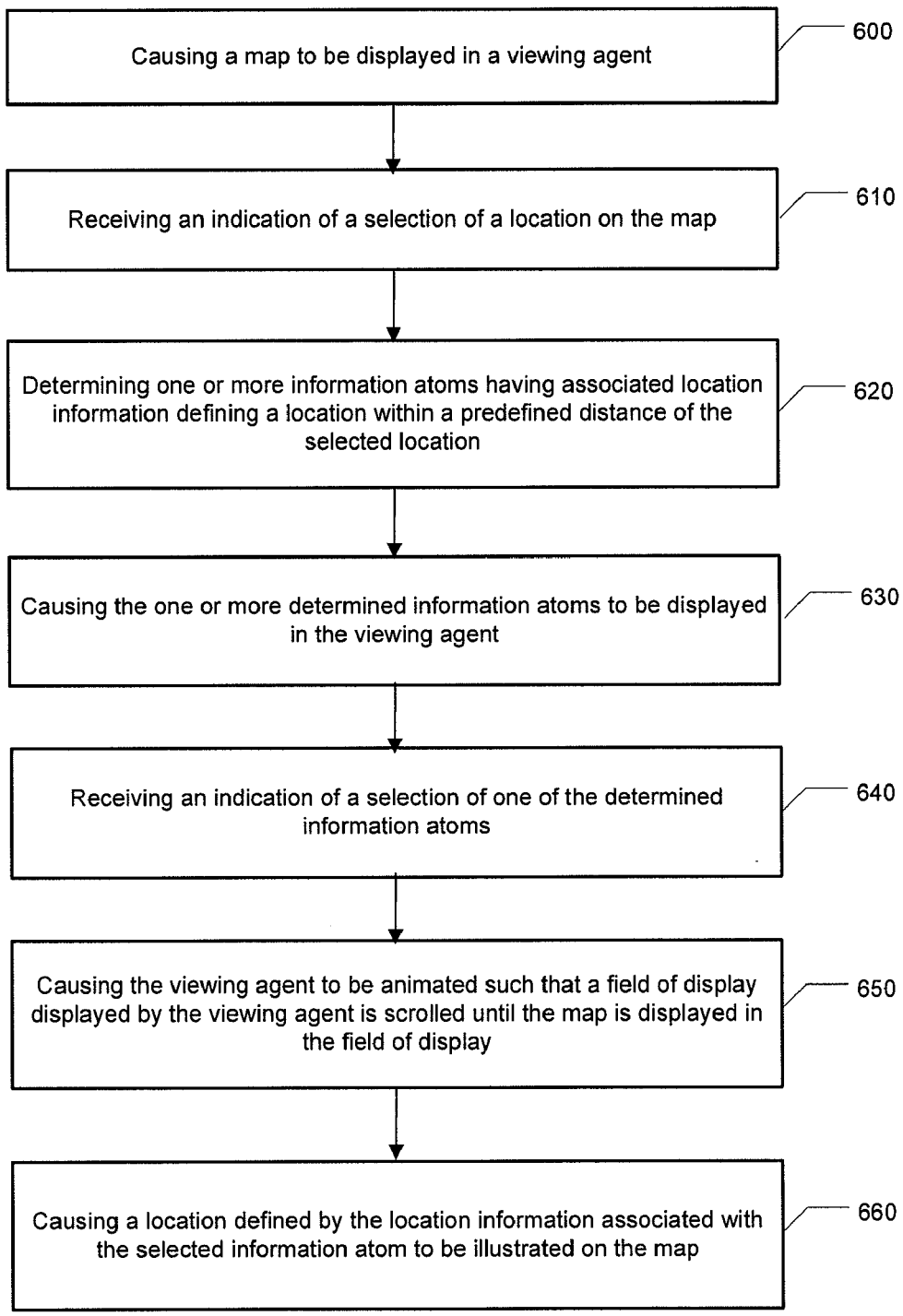
FIG. 6 is a flowchart according to an exemplary method for providing activity coordination information according to an exemplary embodiment of the present invention.
Figure 7:
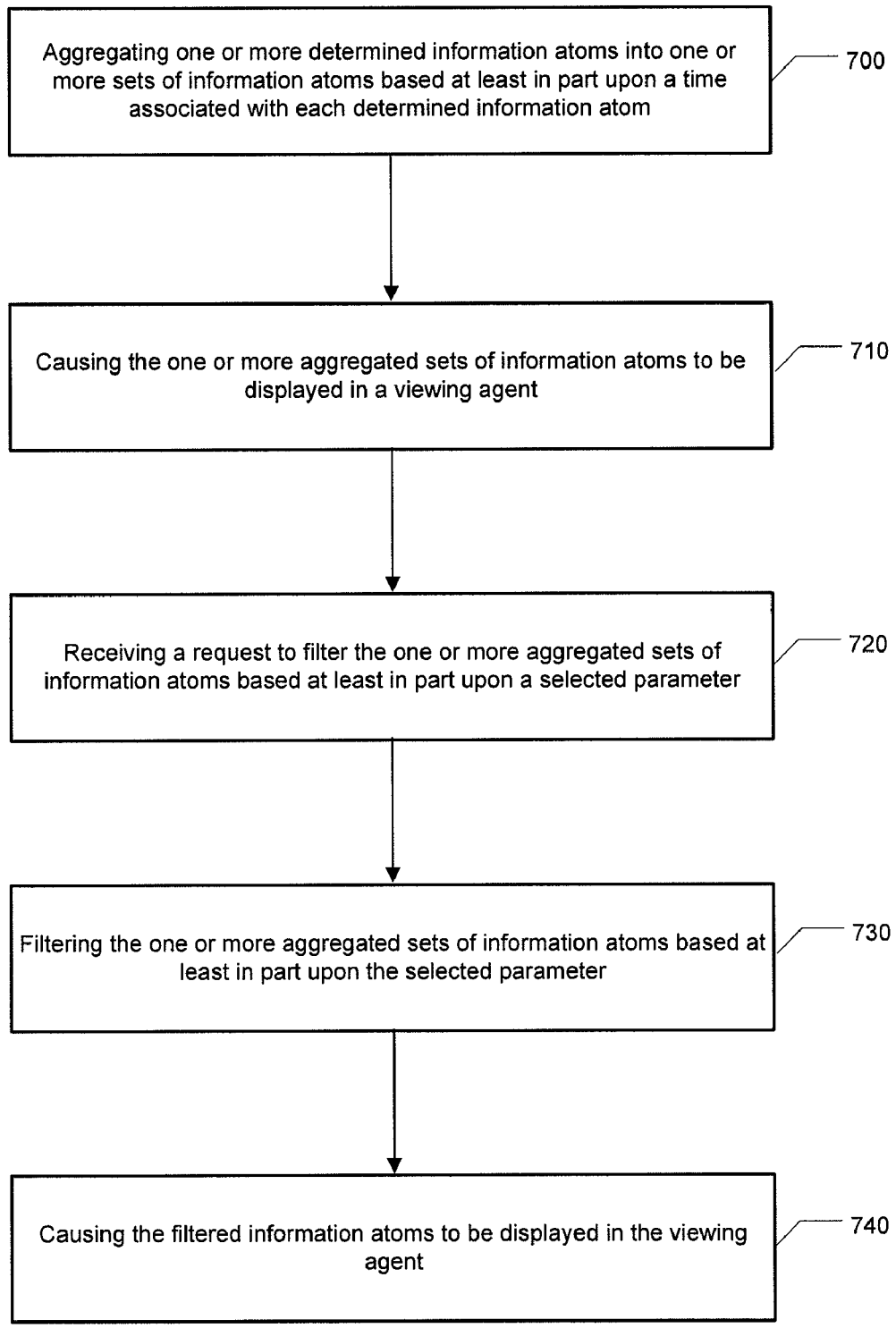
FIG. 7 is a flowchart according to an exemplary method for providing aggregated and filtered activity coordination information according to an exemplary embodiment of the present invention.

FIGS. 6-7 are flowcharts of systems, methods, and computer program products according to exemplary embodiments of the invention. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a processor in the computing device. In some embodiments, the computer program instructions which embody the procedures described above may be stored by memory devices of a plurality of computing devices. As will be appreciated, any such computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

In this regard, one exemplary method for providing activity coordination information according to an exemplary embodiment of the present invention is illustrated in FIG. 6. The method may include the activity coordination unit 118 causing a map to be displayed in a viewing agent, at operation 600. Operation 610 may comprise the activity coordination unit 118 receiving an indication of a selection of a location on the map. The activity coordination unit 118 may then determine one or more information atoms having associated location information defining a location within a predefined distance of the selected location, at operation 620. Operation 630 may comprise the activity coordination unit 118 causing the one or more determined information atoms to be displayed in the viewing agent. The activity coordination unit 118 may then receive an indication of a selection of one of the determined information atoms, at operation 640. Operation 650 may comprise the activity coordination unit 118 causing the viewing agent to be animated such that a field of display displayed by the viewing agent is scrolled until the map is displayed in the field of display. The activity coordination unit 118 may then cause a location defined by the location information associated with the selected information atom to be illustrated on the map, at operation 660.

FIG. 7 illustrates one exemplary method for providing aggregated and filtered activity coordination information according to an exemplary embodiment of the present invention. The method may include the activity coordination unit 118 aggregating one or more determined information atoms into one or more sets of information atoms based at least in part upon a time associated with each determined information atom, at operation 700. Operation 710 may comprise the activity coordination unit 118 causing the one or more aggregated sets of information atoms to be displayed in a viewing agent. The activity coordination unit 118 may then receive a request to filter the one or more aggregated sets of information atoms based at least in part upon a selected parameter, at operation 720. Operation 730 may comprise the activity coordination unit 118 filtering the one or more aggregated sets of information atoms based at least in part upon the selected parameter. The activity coordination unit 118 may then cause the filtered information atoms to be displayed in the viewing agent, at operation 740.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention may provide several advantages to a user of a computing device, such as a mobile terminal 10. Embodiments of the invention may provide for activity-based services. In this regard, embodiments of the invention may provide activity coordination information to users, such as in response to a query. In an exemplary embodiment, a user may be able to select a location on a map using a graphical interface without being required to know and enter location information such as addresses or latitude and longitude coordinates. The user may then be presented with contacts, activities, and/or places having an associated location within a predefined distance of the selected location. In some embodiments, activity coordination information may be aggregated into sets and users may be able to filter the aggregated sets of information based at least in part upon a selected filtering parameter.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving an indication of a selection of a location on a map displayed in a viewing agent, the selection comprising user selection of a location on the map with a graphical selection tool, wherein the selected location defines a query location;
    determining, by a processor, one or more information atoms having associated location information defining a location within a predefined distance of the query location, wherein the one or more determined information atoms comprise one or more of one or more activities having an associated location within the predefined distance of the query location or one or more contacts having an associated location within the predefined distance of the query location; and
    causing the one or more determined information atoms to be displayed in the viewing agent.

2. A method according to claim 1, wherein causing the one or more determined information atoms to be displayed comprises causing the one or more determined information atoms to be displayed in one or more lists, wherein each list is comprised of a single category of information atoms.

3. A method according to claim 1, further comprising:
    receiving an indication of a selection of one of the determined information atoms;
    causing the viewing agent to be animated such that a field of display displayed by the viewing agent is scrolled until the map is displayed in the field of display; and
    causing a location defined by the location information associated with the selected information atom to be illustrated on the map.

4. A method according to claim 1, wherein the one or more determined information atoms comprise information about one or more places.

5. A method according to claim 1, wherein receiving an indication of a selection of a location on the map comprises receiving an indication of the user dragging a selection tool to a location on the map.

6. A method according to claim 1, wherein the map is displayed in the viewing agent on a display device.

7. A method according to claim 1, further comprising:
    aggregating the one or more determined information atoms into a timeline based at least in part upon a time associated with each determined information atom; and
    wherein causing the one or more determined information atoms to be displayed comprises causing the timeline to be displayed in the viewing agent.

8. A method according to claim 1, further comprising:
    aggregating the one or more determined information atoms into one or more sets of information atoms based at least in part upon a time associated with each determined information atom; and
    wherein causing the one or more determined information atoms to be displayed comprises causing the one or more aggregated sets of information atoms to be displayed in the viewing agent.

9. A method according to claim 8, further comprising:
    receiving a request to filter the one or more aggregated sets of information atoms based at least in part upon a selected parameter;
    filtering the one or more aggregated sets of information atoms based at least in part upon the selected parameter; and
    causing the filtered information atoms to be displayed in the viewing agent.

10. A method according to claim 9, wherein the selected parameter comprises one or more of a timeframe, a contact, a group of contacts, a place, or an activity type.

11. A computer program product comprising at least one non-transitory computer-readable storage medium having computer-readable program instructions stored therein, the computer-readable program instructions comprising:
    program instructions configured to receive an indication of a selection of a location on a map displayed in a viewing agent, the selection comprising user selection of a location on the map with a graphical selection tool, wherein the selected location defines a query location;
    program instructions configured to determine one or more information atoms having associated location information defining a location within a predefined distance of the query location, wherein the one or more determined information atoms comprise one or more of one or more activities having an associated location within the predefined distance of the query location or one or more contacts having an associated location within the predefined distance of the query location; and
    program instructions configured to cause the one or more determined information atoms to be displayed in the viewing agent.

12. A computer program product according to claim 11, wherein the program instructions configured to cause the one or more determined information atoms to be displayed in the viewing agent comprise program instructions configured to cause the one or more determined information atoms to be displayed in one or more lists, wherein each list is comprised of a single category of information atoms.

13. A computer program product according to claim 11, further comprising:
   program instructions configured to receive an indication of a selection of one of the determined information atoms;
   program instructions configured to cause the viewing agent to be animated such that a field of display displayed by the viewing agent is scrolled until the map is displayed in the field of display; and
   program instructions configured to cause a location defined by the location information associated with the selected information atom to be illustrated on the map.

14. A computer program product according to claim 11, wherein the one or more determined information atoms comprise information about one or more places.

15. A computer program product according to claim 11, wherein the program instructions configured to receive the indication of a selection of a location on the map comprise program instructions configured to receive an indication of the user dragging a selection tool to a location on the map.

16. A computer program product according to claim 11, further comprising:
   program instructions configured to aggregate the one or more determined information atoms into one or more sets of information atoms based at least in part upon a time associated with each determined information atom; and
   wherein the program instruction configured to cause the one or more determined information atoms to be displayed comprise program instructions configured to cause the one or more aggregated sets of information atoms to be displayed in the viewing agent.

17. A computer program product according to claim 16, further comprising:
   program instructions configured to receive a request to filter the one or more aggregated sets of information atoms based at least in part upon a selected parameter;
   program instructions configured to filter the one or more aggregated sets of information atoms based at least in part upon the selected parameter; and
   program instructions configured to cause the filtered information atoms to be displayed in the viewing agent.

18. An apparatus comprising at least one processor and at least one memory storing computer program code, wherein the at least one memory and stored computer program code are configured, with the at least one processor, to cause the apparatus to at least:
   receive an indication of a selection of a location on a map displayed in a viewing agent, the selection comprising user selection of a location on the map with a graphical selection tool, wherein the selected location defines a query location;
   determine one or more information atoms having associated location information defining a location within a predefined distance of the query location, wherein the one or more determined information atoms comprise one or more of one or more activities having an associated location within the predefined distance of the query location or one or more contacts having an associated location within the predefined distance of the query location; and
   cause the one or more determined information atoms to be displayed in the viewing agent.

19. An apparatus according to claim 18, wherein the at least one memory and stored computer program code are configured, with the at least one processor, to cause the apparatus to cause the one or more determined information atoms to be displayed by causing the one or more determined information atoms to be displayed in one or more lists, wherein each list is comprised of a single category of information atoms.

20. An apparatus according to claim 18, wherein the at least one memory and stored computer program code are configured, with the at least one processor, to further cause the apparatus to:
   receive an indication of a selection of one of the determined information atoms;
   cause the viewing agent to be animated such that a field of display displayed by the viewing agent is scrolled until the map is displayed in the field of display; and
   cause a location defined by the location information associated with the selected information atom to be illustrated on the map.

21. An apparatus according to claim 18, wherein the one or more determined information atoms comprise information about one or more places.

22. An apparatus according to claim 18, wherein the at least one memory and stored computer program code are configured, with the at least one processor, to further cause the apparatus to receive an indication of a selection of a location on the map by receiving an indication of the user dragging a selection tool to a location on the map.

23. An apparatus according to claim 18, wherein the at least one memory and stored computer program code are configured, with the at least one processor, to further cause the apparatus to:
   aggregate the one or more determined information atoms into a timeline based at least in part upon a time associated with each determined information atom; and
   cause the one or more determined information atoms to be displayed at least in part by causing the timeline to be displayed in the viewing agent.

24. An apparatus according to claim 18, wherein the at least one memory and stored computer program code are configured, with the at least one processor, to further cause the apparatus to:
   aggregate the one or more determined information atoms into one or more sets of information atoms based at least in part upon a time associated with each determined information atom; and
   cause the one or more determined information atoms to be displayed by causing the one or more aggregated sets of information atoms to be displayed in the viewing agent.

25. An apparatus according to claim 24, wherein the at least one memory and stored computer program code are configured, with the at least one processor, to further cause the apparatus to:
   receive a request to filter the one or more aggregated sets of information atoms based at least in part upon a selected parameter;
   filter the one or more aggregated sets of information atoms based at least in part upon the selected parameter; and
   cause the filtered information atoms to be displayed in the viewing agent.

26. An apparatus according to claim 25, wherein the selected parameter comprises one or more of a timeframe, a contact, a group of contacts, a place, or an activity type.

27. A method according to claim 1, further comprising:
   correlating the selected location to one or more of a physical address or physical coordinates, wherein the one or more of a physical address or physical coordinates comprises the query location.

* * * * *